(12) United States Patent
Friedrich et al.

(10) Patent No.: US 10,102,931 B2
(45) Date of Patent: Oct. 16, 2018

(54) CONNECTING DEVICE FOR CONNECTING A GUIDE TUBE TO A LOWER END NOZZLE IN A NUCLEAR FUEL ASSEMBLY

(75) Inventors: Erhard Friedrich, Eckental (DE); Gregor Munsterjohann, Neunkirchen (DE); Bernd Block, Erlangen (DE)

(73) Assignee: AREVA NP, Courbevoie (FR)

( * ) Notice: Subject to any disclaimer, the term of this patent is extended or adjusted under 35 U.S.C. 154(b) by 1070 days.

(21) Appl. No.: 13/121,343

(22) PCT Filed: Sep. 14, 2009

(86) PCT No.: PCT/EP2009/061845
§ 371 (c)(1),
(2), (4) Date: Jul. 7, 2011

(87) PCT Pub. No.: WO2010/034633
PCT Pub. Date: Apr. 1, 2010

(65) Prior Publication Data
US 2011/0261920 A1      Oct. 27, 2011

(30) Foreign Application Priority Data

Sep. 26, 2008 (EP) .................................. 08305602

(51) Int. Cl.
*G21C 3/334* (2006.01)
*F16B 7/18* (2006.01)
*F16B 41/00* (2006.01)

(52) U.S. Cl.
CPC .............. *G21C 3/334* (2013.01); *F16B 7/182* (2013.01); *F16B 41/002* (2013.01); *Y02E 30/40* (2013.01)

(58) Field of Classification Search
None
See application file for complete search history.

(56) References Cited

U.S. PATENT DOCUMENTS

| 2,602,191 | A | * | 7/1952 | Joy ................................ 249/59 |
| 2,921,616 | A | * | 1/1960 | Threewit et al. ............. 411/350 |
| 3,221,794 | A | | 12/1965 | Acres |
| 3,343,581 | A | * | 9/1967 | Martin et al. ................. 411/349 |
| 3,465,803 | A | | 9/1969 | Ernest et al. |
| 4,427,624 | A | * | 1/1984 | Marlatt et al. ................ 376/352 |
| 4,668,469 | A | | 5/1987 | Widener |
| 5,382,124 | A | * | 1/1995 | Frattarola .................... 411/352 |
| 6,461,091 | B2 | * | 10/2002 | Herb et al. .................... 411/339 |

FOREIGN PATENT DOCUMENTS

| EP | 0895248 | 2/1999 |
| EP | 2000681 | 12/2008 |
| EP | 2048384 | 4/2009 |

* cited by examiner

*Primary Examiner* — Jack W Keith
*Assistant Examiner* — Lily C Garner
(74) *Attorney, Agent, or Firm* — Davidson, Davidson & Kappel, LLC

(57) ABSTRACT

A connecting device including a nut, a screw, a body having a bore for screwing the screw to the nut through the bore with the screw abutting an abutment surface of the body, a screw locking device for preventing loosening of the screw. According to one aspect of the invention, the locking device is adapted for axially retaining the screw into the body after unscrewing the screw.

20 Claims, 5 Drawing Sheets

CONNECTING DEVICE FOR CONNECTING A GUIDE TUBE TO A LOWER END NOZZLE IN A NUCLEAR FUEL ASSEMBLY

The present invention relates to a connecting device for connecting a guide tube to a lower nozzle in a nuclear fuel assembly, of the type comprising a screw, a body having a bore for screwing the screw to a nut through the bore with the screw abutting an abutment surface of the body, a locking device for preventing loosening of the screw.

BACKGROUND

A nuclear fuel assembly for pressurized water reactor (PWR) comprises a bundle of fuel rods and a structure, the structure comprising a lower nozzle, an upper nozzle, a plurality of guide tubes connecting the nozzles and supporting grids distributed along the guide tubes between the nozzles, the fuel rods being supported by the grids between the nozzles.

The guide tubes are generally connected to the lower nozzle by connection devices of the above-mentioned type, the bore being provided in the nozzle and the screw being engaged through the bore in the nut provided at the lower end of a guide tube.

In one conventional embodiment, the screw head has an upstanding annular wall which extends contiguous with the bore once the screw is torqued to its tightened position. Opposite diametric portions of the annular wall on the screw head are then bulged into recesses provided in the bore, thus providing a locking device which prevents self-unscrewing of the screw.

U.S. Pat. No. 4,668,469 describes a connection device of the above-mentioned type comprising an annular locking sleeve which surrounds the head of the screw, the sleeve having a pair of projections engaged in corresponding recesses of the body for locking the sleeve in rotation relative to the body, the sleeve being in frictional engagement with the driving head of the screw for locking the screw in rotation relative to the body.

SUMMARY OF THE INVENTION

During maintenance operations, it may be desirable to remove the lower nozzle, e.g. to replace one of the fuel rods. It is thus necessary to unscrew the screws of the connection devices to remove the bottom nozzle.

However, the prior art connection devices having locking devices have found to be inconvenient during maintenance operation. To remove the lower nozzle, all the connection devices of guide tubes to bottom nozzle need to be completely removed. The locking devices are frequently scrapped after one-time use due to cracks and tears of the bulging parts of the screw head formed therein by the unscrewing operation and need to be replaced. This leads to producing irradiated scrape material which has to be stored in one nuclear reactor pool before evacuation and final storage. The reusable parts of the connection devices, if any, are temporarily stored until reusing. There is a risk of fall of the connection devices during disassembling and reassembling of the lower nozzle which could cause incidents during the fall, additional handling operations and consequently a risk of increased radiation dose for the operators.

An object of the invention is to provide a connection device which eases maintenance operations.

To this end, the invention provides a connection device of the above-mentioned type, wherein the locking device is adapted for retaining the screw into the body after unscrewing the screw.

In other embodiments, the connection device comprises one or more of the following features, taken in isolation or in any technically feasible combination:

the locking device comprises an elastic locking member adapted to axially push the screw along the screw axis towards the abutment surface;

the locking device comprises an elastic locking member adapted to be activated upon tightening the screw and to axially push the screw along the screw axis towards the abutment surface;

the elastic locking member is a radially elastic ring mounted in an annular mounting groove provided in the body or the screw;

the locking device comprises a locking groove provided in the other one of the body and the screw to receive the ring when the screw is tightened to the nut;

the locking device comprises a retaining groove provided in the other one of the body and the screw for receiving the ring when the screw is unscrewed;

the retaining groove is adapted to allow pulling the screw out the body by exerting an axial force sufficient for the ring to pass the retaining groove;

the connecting device comprises an elastic locking member arranged to permanently axially push the screw along the screw axis towards the abutment surface;

the connecting device comprises an elastic locking member in the form of an axially compressible spring preloaded to axially push the screw towards the abutment surface;

the spring is helical and has an upper end abutting an upper seat of the screw and a lower end abutting a lower seat of the body, the upper end being of lower diameter that the lower end;

the body is separate and distinct from a lower nozzle; and it comprises a nut, the screw being adapted for screwing to the nut through the bore.

An embodiment of the invention provides a nuclear fuel assembly comprising a bundle of fuel rods and a structure for supporting the fuel rods, the structure comprising an upper nozzle, a lower nozzle and guide tubes extending between the upper nozzle and the lower nozzle, and at least one connecting device and connecting the lower end of a guide tube to the lower nozzle.

The invention also provides a nuclear assembly comprising a bundle of fuel rods and a structure for supporting the fuel rods, the structure comprising an upper nozzle, a lower nozzle and guide tubes extending between the upper nozzle and the lower nozzle, and at least one connecting device as defined above connecting the lower end of a guide tube to the lower nozzle.

BRIEF DESCRIPTION OF THE DRAWINGS

The invention and its advantages will be better understood on reading the following description given only by way of example and with reference to the appended drawings, in which.

DETAILED DESCRIPTION

Figure 1:
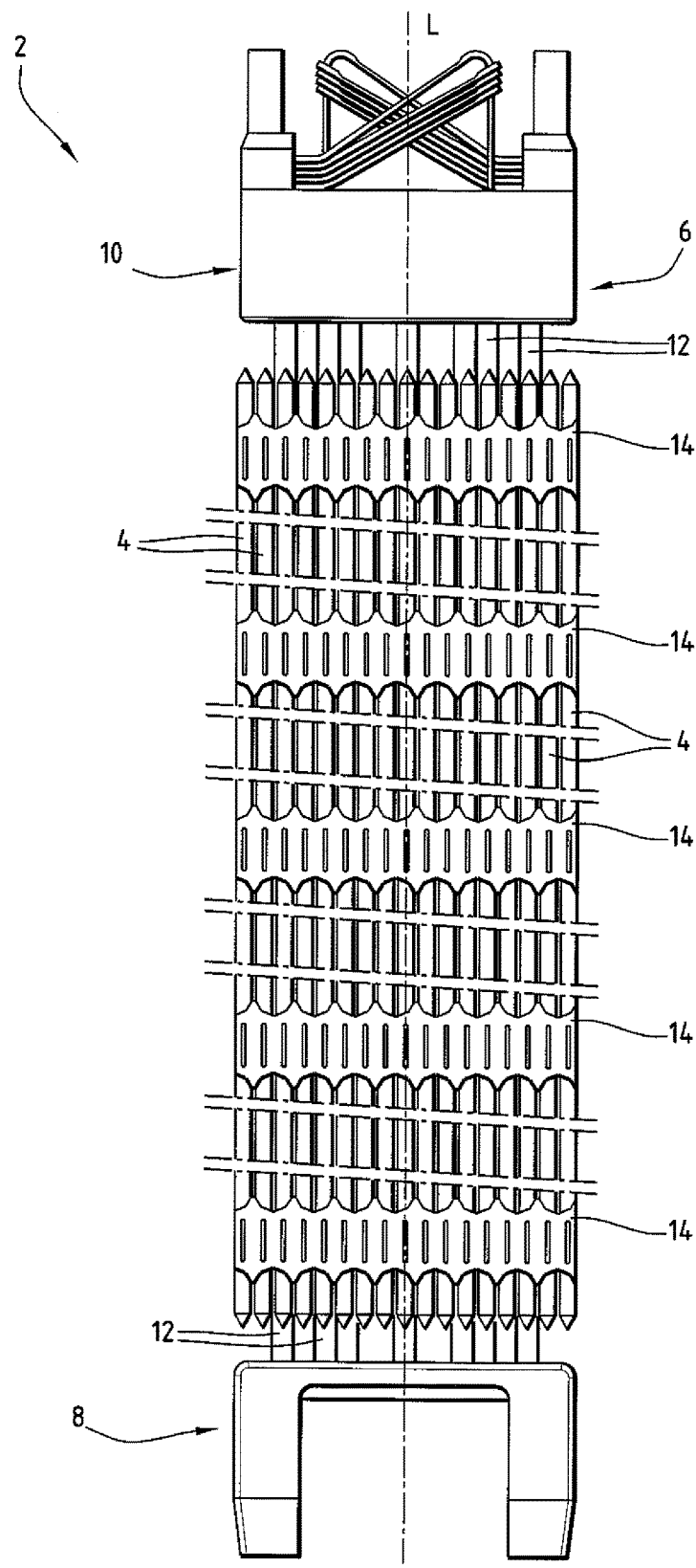
FIG. 1 is an elevation side view of a nuclear fuel assembly comprising a connection device according to the invention.

The nuclear fuel assembly 2 illustrated in FIG. 1 is adapted for a PWR reactor. It comprises a bundle of nuclear fuel rods 4 and a structure 6 for supporting the fuel rods 4.

The assembly 2 extends along a longitudinal axis L. Axis L extends vertically when the assembly 2 is disposed inside a nuclear reactor. In the following, the terms "upper" and "lower" refer to the position of the assembly 2 in a nuclear reactor.

Each fuel rod 4 comprises a tubular cladding, pellets of nuclear fuel stacked in the cladding, and caps closing the upper and lower ends of the cladding.

The structure 6 comprises a lower nozzle 8, an upper nozzle 10, a plurality of guide tubes 12 and supporting grids 14 distributed along the guide tubes 12.

The lower nozzle 8 and the upper nozzle 10 are spaced one from the other along axis L. The guide tubes 12 extend longitudinally between the lower nozzle 8 and the upper nozzle 10 and connect the nozzles 8, 10. The guide tubes 12 maintain a predetermined longitudinal spacing between the nozzles 8, 10.

The grids 14 are distributed along the guide tubes 12 and connected to them. The fuel rods 4 extend longitudinally between the nozzles 8, 10 through the grids 14. The grids 14 support the fuel rods 4 transversely and longitudinally.

The nozzles 8, 10 are provided with through openings for allowing a vertical water flow through the assembly 2 from lower end toward upper end thereof.

The upper end of the guide tubes 12 are rigidly connected to the upper nozzle 10 in a manner known per se. Each guide tube 12 opens upwardly for allowing insertion of a control rod downwardly inside the guide tube 12.

The lower ends of the guide tubes 12 are rigidly connected to the lower nozzle 8 in a similar manner. Only one guide tube 12 and its connection to the lower nozzle 8 will be described in greater detail with reference to FIGS. 2-4.

Figure 2:
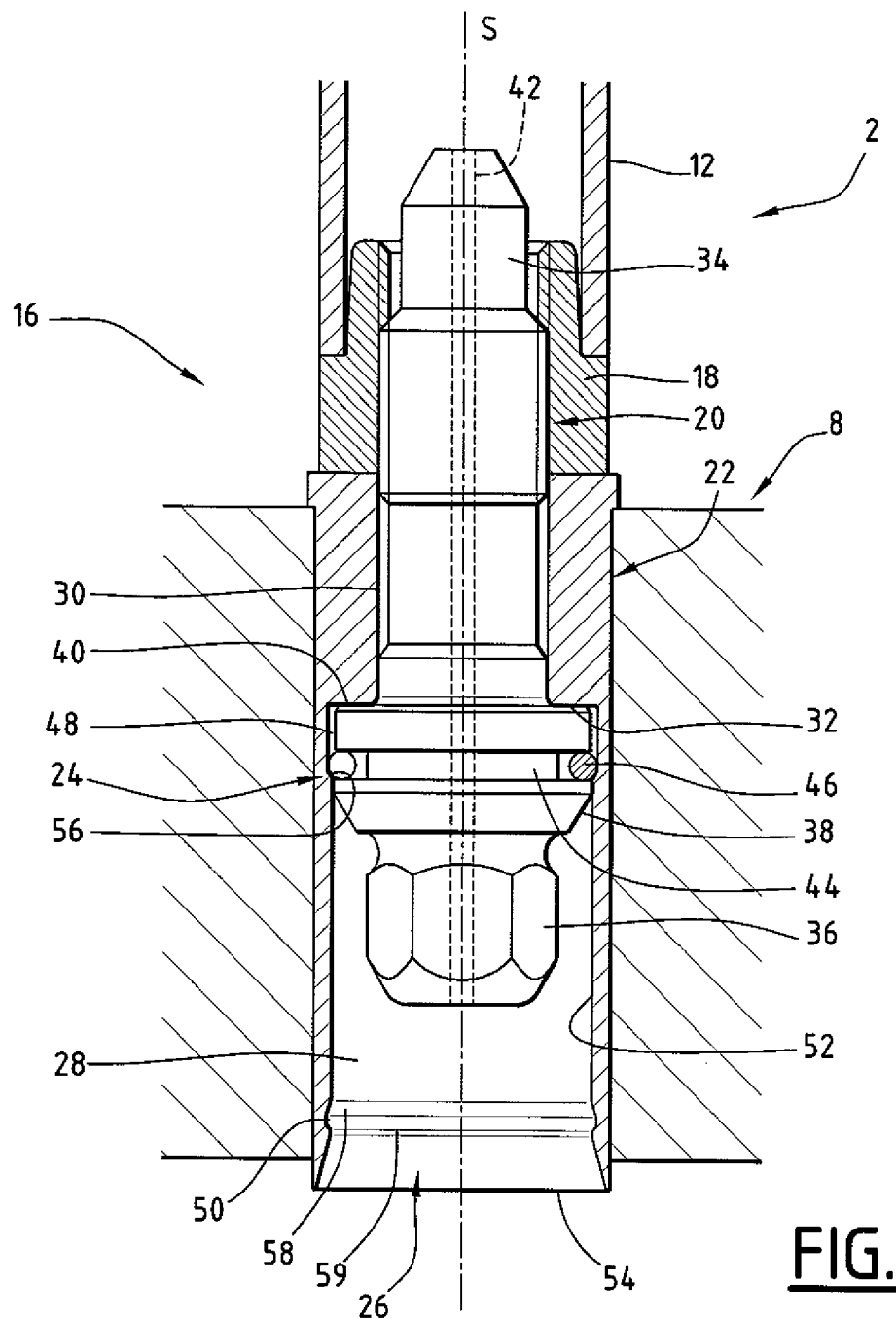
FIGS. 2 and 3 are cross-sectional views of one of the connection devices in two different configurations.
Figure 3:
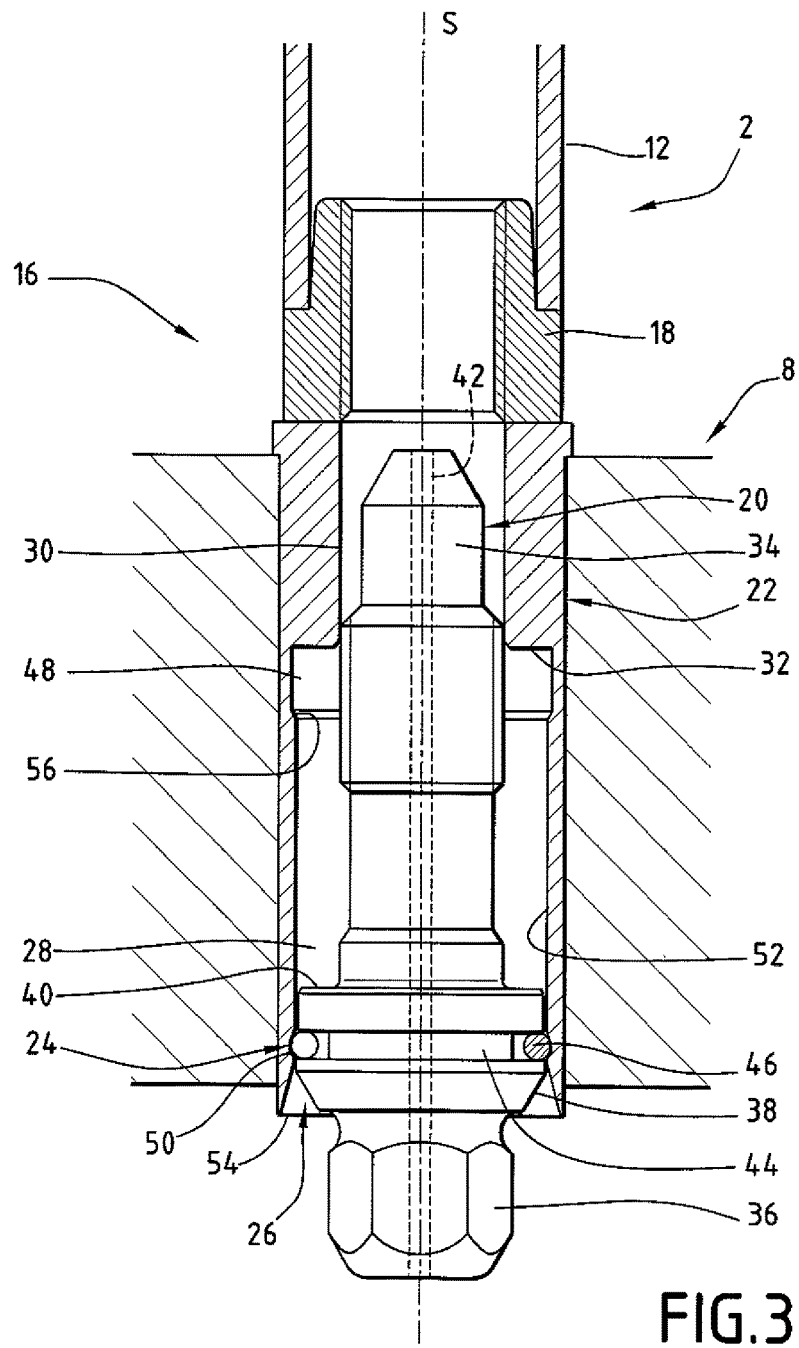

As illustrated on FIGS. 2 and 3, the assembly 2 comprises a connection device 16 connecting the lower end of the guide tube 12 to the lower nozzle 8.

The connection device 16 comprises a nut 18, a screw 20, a tubular body 22 and a screw locking device 24.

The nut 18 has an internal thread. It is fixed at the lower end of the guide tube 12, e.g. by welding or brazing, such that the screw longitudinal axis S coincides with the axis of the guide tube 12.

The body 22 is fixed to lower nozzle 8 e.g. by welding. The body 22 extends axially through the lower nozzle 8 and has a longitudinal through bore 26 extending along the screw axis S for passing the screw 20 through the body 22.

The bore 26 is stepped. It comprises a lower section 28 of large diameter, an upper section 30 of small diameter and a radial annular shoulder 32 extending between the adjacent ends of the lower section 28 and the upper section 30 and acting as abutment surface.

The screw 20 is adapted to be inserted inside the lower section 28 and screwed in the nut 18 through the upper section 30 with axially abutting the shoulder 32. The screw 20 has an upper threaded shank 34, a lower driving head 36 and an intermediate stop portion 38 located between the shank 34 and the driving head 36.

The stop portion 38 is of greater diameter than the shank 34 and the driving head 36. The stop portion 38 has an upwardly facing annular bearing surface 40 for contacting the shoulder 32.

The screw 20 has a longitudinal water duct 42 extending axially through the screw 20 at the center thereof, from end to end. The duct 42 is provided to allow a water flow through the screw 20 and inside the guide tube 12 for cooling a control rod received inside the guide tube 12.

The locking device 24 is adapted for preventing unintentional loosening of the screw 20. It comprises an annular mounting groove 44, a locking ring 46 disposed inside the mounting groove 44 and two receiving grooves 48, 50.

The mounting groove 44 is provided on the outer surface of the screw 20. It is located in the stop portion 38. It opens radially outwardly toward the inner surface of the lower section 28.

The ring 46 is mounted into the mounting groove 44 and is radially expandable and contractible in an elastic manner.

The ring 46 is made of a material having a high elastic limit, such as e.g. a nickel- or iron-based superalloy or structurally hardened stainless steel.

The ring 46 is provided with a diameter in a free state which is greater than the inner diameter of the lower section 28, such that the ring 46 is in permanent contact with the inner surface of the lower section 28.

The ring 46 and the mounting groove 44 are arranged such that the ring 46 is retractable into the mounting groove 44.

The ring 46 is rotatable relative to the screw 20, around the screw axis S.

Figure 4:
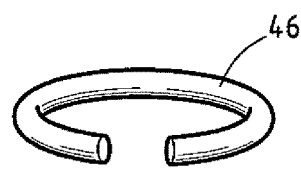
FIG. 4 is a perspective view of an elastic member of a locking device of the connection device of FIGS. 2 and 3.

As illustrated on FIG. 4, the ring 46 is split to increase radial elasticity and to allow mounting of the ring 46 into the mounting groove 44. In the illustrated embodiment, the ring 46 has a circular cross section.

As illustrated on FIGS. 2 and 3, the receiving grooves 48, 50 comprise a locking groove 48 and a retaining groove 50 provided in the inner surface of the lower section 28. The receiving grooves 48, 50 are mutually spaced along the screw axis S and separated by a smooth cylindrical slide surface 52.

The locking groove 48 is adjacent to the shoulder 32 and the retaining groove 50 is adjacent to a lower opened end 54 of the lower section 28.

Each receiving groove 48, 50 is adapted for allowing elastic expansion of the ring 46 when the mounting groove 44 faces the receiving groove 48, 50, such that the ring 46 axially locks the screw 20 relative to the body 22.

The locking groove 48 has a lower lateral wall 56 oriented upwardly. The lower lateral wall 56 is conical and diverges upwardly. The conical surface makes for example an angle of approximately 15° with the screw axis S.

The retaining groove 50 has an upper lateral wall 58 oriented downwardly and a lower lateral wall 59 oriented upwardly (FIG. 2). Each lateral wall is substantially conical and makes an angle with the screw axis S. The angle between the lower lateral wall 59 and the screw axis S is e.g. of approximately 15°. The angle between the upper lateral wall 58 and the screw axis S is preferably equal or less than the angle between the lower lateral wall 59 and the screw axis.

The screw 20 is axially movable relative to the body 22 between a screwed position (FIG. 2) and an unscrewed position (FIG. 3).

In the screwed position (FIG. 2), the stop portion 38 abuts the shoulder 32 and the mounting groove 44 faces the locking groove 48 such that the ring 46 contacts the lower lateral wall 56. The shank 34 protrudes upwardly from the bore 26 to be engaged in the nut 18.

In the unscrewed position of the screw 20 (FIG. 3), the stop portion 38 is axially spaced apart from the shoulder 32, and the mounting groove 44 is in facing the retaining groove 50. The shank 34 is retracted into the bore 26.

In the screwed position (FIG. 2), the ring 46 pushes the screw 20 against the shoulder 32 and locks the screw 20 by preventing axial movement of the screw 20 away from the shoulder 32.

As a matter of fact, the ring 46 tends to radially expand and exerts an axial upward force on screw 20 due to the inclination of the conical lower lateral wall 56. Downward axial movement of the screw 20 requires an axial force sufficient to overcome the axial preload and contract the ring 46 into the mounting groove 44.

Therefore, when the screw 20 is engaged with the nut 18, unscrewing rotation of the screw 20 requires an initial torque sufficient to force the radial elastic contraction of the ring 46. The ring 46 thus prevents self-unscrewing of the screw.

When the ring 46 is retracted into the mounting groove 44, further axial movement of the screw 20 is accompanied by the ring 46 sliding along the slide surface 52.

The retaining groove 50 functions similarly to the locking groove 48 and prevents unintentional axial movement of the screw 20 relative to the body in both direction (upwardly and downwardly). Axial movement is authorized only under a minimal axial force.

Once the mounting groove 44 is facing the retaining groove 50, the ring 46 expands radially into the retaining groove 50 and locks the screw 20 axially relative to the body 22 in the unscrewed position (FIG. 3). This provides a safety to unintentional complete extraction of the screw 20 outside the body 22.

If necessary, the screw 20 can be pulled downwards from the body 22, e.g. for replacing the screw 20, but this necessitates to exert an axial force sufficient for the ring 46 to pass the retaining groove 50 downwardly.

For moving the screw 20 from the unscrewed position toward the screwed position, it is necessary to exert an axial force sufficient for the ring 46 to pass the retaining groove 50 upwardly.

The connection device 16 is reusable. As a matter of fact, the ring 46 will relock into the locking groove 48 upon screwing the screw 20 again. The locking function of the locking device 24 automatically activates upon screwing the screw 20. As a matter of fact, the locking device 24 will activate when the mounting groove 44 will face the locking groove 48 upon screwing.

Once activated, the locking device 24 axially preloads the screw 20 against the shoulder 32 and thus prevents axial movement of the screw 20 relative to the body 22. This enables screw 20 lock since unscrewing movement is helical, i.e. a combination of a rotation and an axial translation. There are of course also rotational frictions between the ring 46 and the locking groove 48.

Axial locking of the screw 20 instead of rotational locking of the screw 20 makes it possible to voluntary unscrew the screw 20 without damaging the locking device 24 since this latter does not oppose to the rotation movement of the screw 20. The connection device 16 can thus be made reusable.

Besides, locking and unlocking are obtained by elastic deformation of an elastic locking member (the ring 46), whereby the locking member recovers its initial state, and the locking device 24 is thus reusable.

The axial force for the ring 46 to pass a receiving groove 48, 50 depends on the inclination of the lateral walls 56, 58, 59 of the receiving grooves 48, 50 relative to the screw axis S. Greater is the inclination, greater is the required force.

The inclination of the conical lower lateral wall 56 of the locking groove 48 is chosen such as to obtain a sufficient axial preload and locking effect along with allowing unscrewing of the screw 20 in view of disassembling the lower nozzle 8 from the guide tube 12.

The inclination of the lower lateral wall 59 of the retaining groove 50 is chosen such as to securely retain the screw 20 while allowing to pull the screw 20 out from the body 22. The inclination of the upper lateral wall 58 of the retaining groove 50 can be smaller to retain the screw 20 in unscrewed position while easily allowing to pushing the screw 20 towards the screwed position.

The embodiment of FIGS. 2-4 thus allows efficiently and securely retaining the screw 20 while still allowing pulling the screw 20 out from the body 22, e.g. for replacement.

In alternative, the lower lateral wall 59 is inclined such as to prevent removing the screw 20. The angle between the lower lateral wall 59 and the screw axis is e.g. of 90°.

Figure 5:
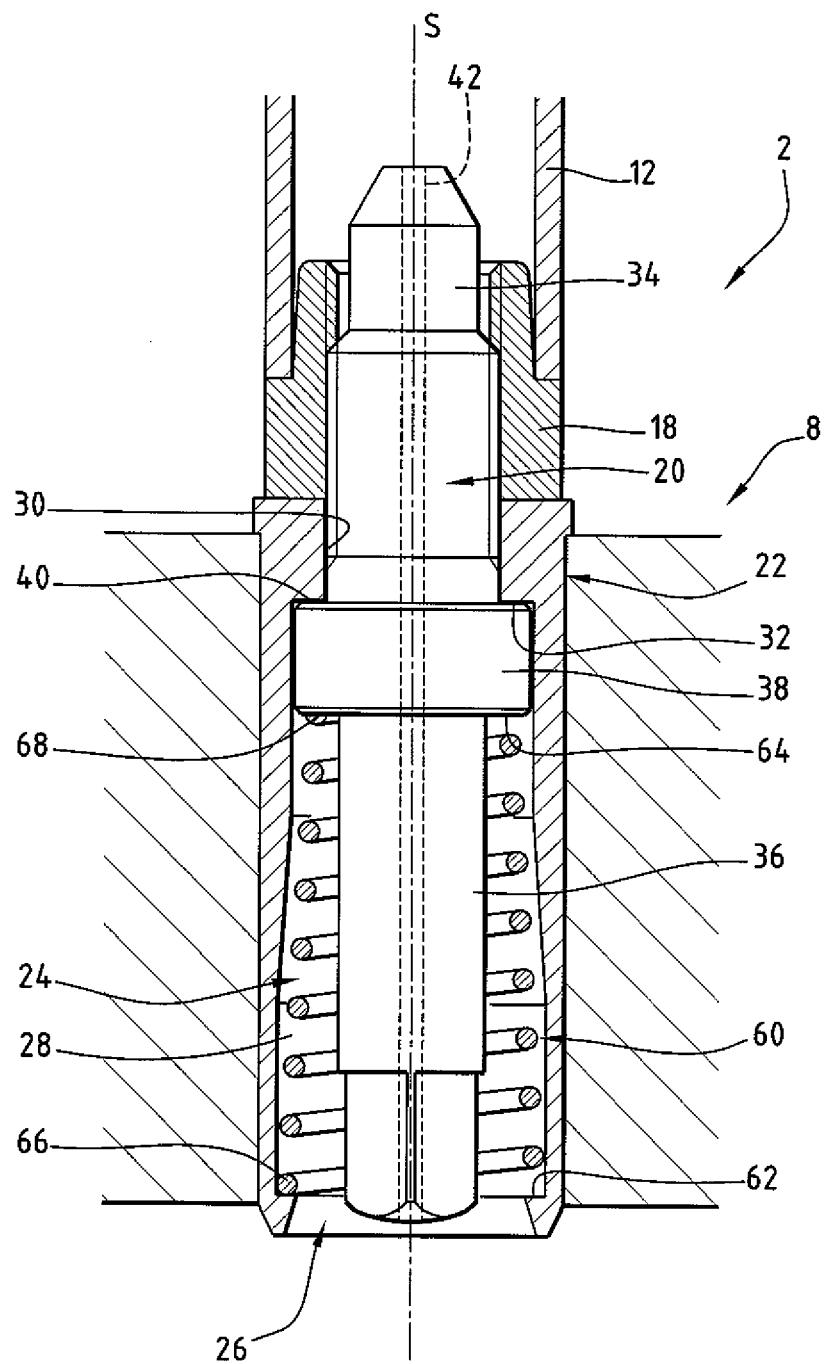
FIGS. 5 and 6 are views corresponding to that of FIG. 2 and illustrating other embodiments of the connection device.

In the embodiment of FIG. 5, the locking device 24 comprises a helical spring 60 used as elastic locking member and disposed to push the screw 20 axially toward the shoulder 32.

The spring 60 is received inside the lower section 28 of the body 22 and around the driving head 36 of the screw 20. The spring 60 is axially compressed between a lower seat 62 provided on the body 22 and an upper seat 64 provided on the screw 20.

The spring 60 is preloaded such that it exerts a permanent axial force of the screw 20 towards the shoulder 32. Therefore, unscrewing the screw 20 requires overcoming the axial preload of the spring 60. The spring 60 thus locks the screw 20 in the screwed position.

The spring 60 is rotatable relative to the screw 20 and thus does not prevent rotation of the screw 20 in view of voluntary unscrewing the screw 20 (there are of course rotational frictions between the spring 60 and the upper seat 64 of the screw 20).

The spring 60 is made of a material having a high elastic limit, such as e.g. a nickel- or iron-based superalloy or structurally hardened stainless steel.

This embodiment is very simple and reliable. The connection device 16 is reusable.

The spring 60 allows axial movement of the screw 20 relative to the body 22 on a limited stroke (corresponding to the complete compression of the spring 60), such that the screw 20 is not removable from the body 22.

For insertion of the spring 60 into the lower section 28, it is possible for instance to successively provide a sheath for radially contracting the spring 60, introduce the spring 60 surrounded by the sheath into the lower section 28 and remove the sheath such that the spring 60 radially expands and adopt the final configuration.

The spring 60 has a lower end 66 which is of greater diameter than the upper end 68 so as to allow insertion of a driving tool within the lower end 66 of the body 22 around the driving head 36 not protruding outside the bore 26. The connection device 16 can thus be made very compact in the axial direction L.

Figure 6:
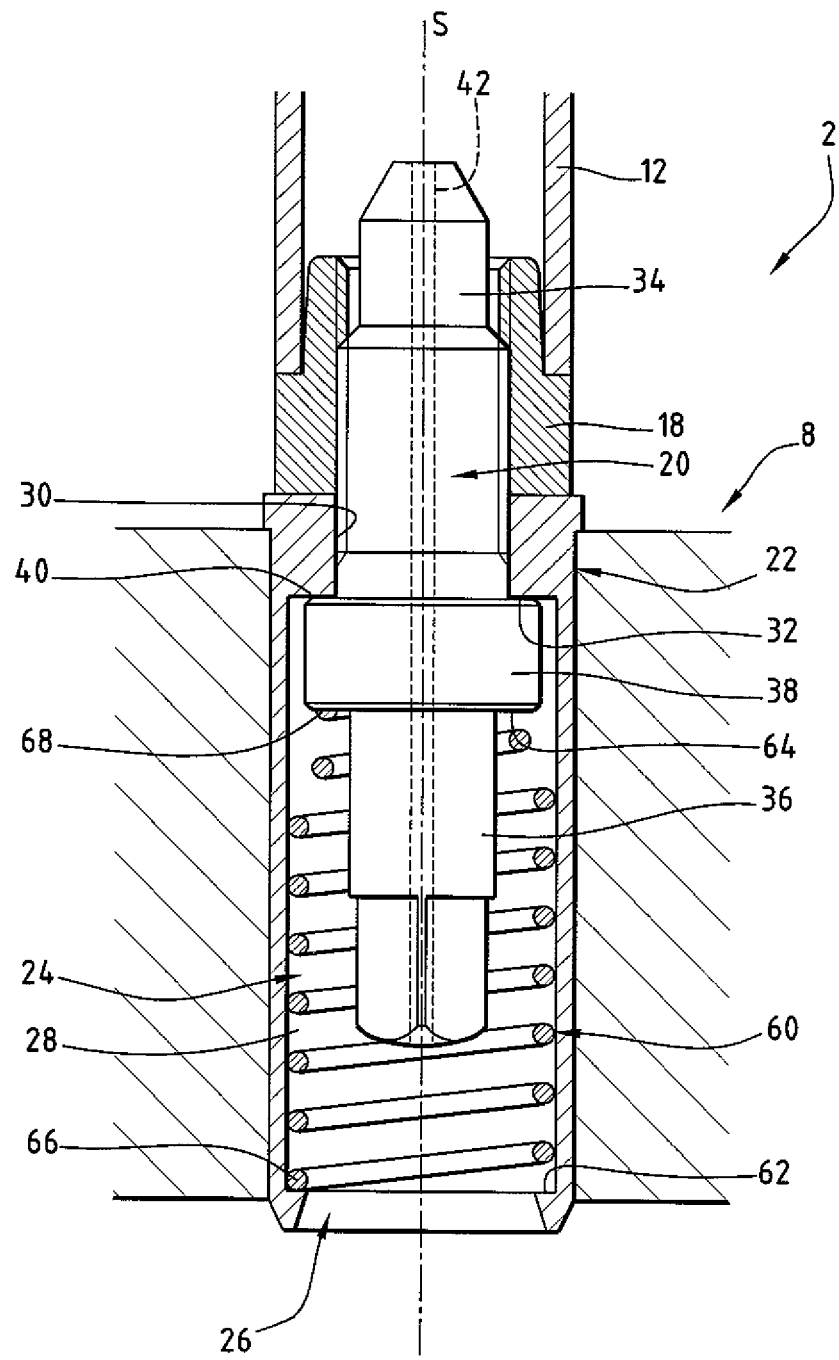

As illustrated on FIG. 5, the spring 60 is conical. In the alternative embodiment illustrated on FIG. 6, the spring 60 has a cylindrical lower portion and an upwardly converging upper portion of reduced diameter. This allows to provide a driving head 36 of shorter length while still allowing insertion of a driving tool.

In the illustrated embodiments, the bodies 22 of the connection devices 16 are separate from the lower nozzle 8. This facilitates manufacturing the lower nozzle 8 by enabling to manufacture the connection device 16 separately from the lower nozzle 8. In alternative, the lower nozzle 8 is used as the body 22 for the connection device 16 by providing the bore 26 directly through the lower nozzle 8.

The connection device 16 is usable for connecting guide tubes 12 to a lower nozzle 8 in a PWR fuel assembly 2, and more generally for connecting a structural component to a nozzle 8 in any kind of nuclear fuel assembly.

What is claimed is:

1. A nuclear fuel assembly, comprising:
   a bundle of fuel rods;
   a structure for supporting the fuel rods, the structure comprising an upper nozzle, a lower nozzle and guide tubes extending between the upper nozzle and the lower nozzle; and
   at least one connecting device connecting a lower end of the guide tubes to the lower nozzle, the connecting device comprising:
      a screw;
      a body having a bore for screwing the screw to a nut through the bore, the screw axially abutting an abutment surface of the body; and
      a locking device for preventing loosening of the screw, the locking device including an elastic locking member adapted for preventing loosening of the screw by axially pushing the screw along a screw axis against the abutment surface, the elastic locking member being adapted for retaining the screw in the body after unscrewing the screw.

2. The connecting device according to claim 1 wherein the elastic locking member is adapted to be activated upon tightening of the screw and to axially push the screw along the screw axis towards the abutment surface.

3. The connecting device according to claim 2 wherein the elastic locking member is a radially elastic ring mounted in an annular mounting groove in the body or the screw.

4. The connecting device according to claim 3 wherein the locking device comprises a locking groove in the other one of the body and the screw to receive the ring when the screw is tightened to the nut.

5. The connecting device according to claim 4 wherein the locking device comprises a retaining groove in the other one of the body and the screw for receiving the ring when the screw is unscrewed.

6. The connecting device according to claim 5 wherein the retaining groove and the ring are configured such that axially pulling of the screw out of the body by exerting an axial force on the screw causes the ring to radially deform and release from the retaining groove.

7. The connecting device according to claim 1 wherein the elastic locking member is arranged to permanently axially push the screw along a screw axis towards the abutment surface.

8. The connecting device according to claim 7 wherein the elastic locking member is an axially compressible spring preloaded to axially push the screw towards the abutment surface.

9. The connecting device according to claim 8 wherein the compressible spring is helical and has an upper end abutting an upper seat of the screw and a lower end abutting a lower seat of the body, the upper end having a smaller diameter than the lower end.

10. The connecting device according to claim 1 wherein the body is separate and distinct from a lower nozzle.

11. The connecting device according to claim 1 wherein the screw is adapted for screwing to the nut through the bore.

12. The connecting device according to claim 1 wherein the screw includes a head and a threaded shank, the head axially abutting the abutment surface of the body, the elastic locking member adapted for axially pushing the head along a screw axis against the abutment surface, the elastic locking member being adapted for contacting the head to retain the head in bore of the body after unscrewing the screw.

13. The connecting device according to claim 1 wherein the elastic locking member contacts a first portion of the body to axially push the screw along the screw axis towards the abutment surface, the elastic locking member contacting a second portion of the body axially offset from the first portion to retain the screw in the body after unscrewing the screw.

14. The connecting device according to claim 13 wherein the first portion defines a first groove and the second portion defines a second groove offset from the first groove.

15. The connecting device according to claim 13 wherein the first portion includes a conical lateral wall and the elastic member radially expands to contact the conical lateral wall to axially push the screw along the screw axis towards the abutment surface.

16. The connecting device according to claim 1 wherein the elastic locking member is an axially compressible spring arranged and configured with respect to the screw and the body such that unscrewing of the screw axially compresses the axially compressible spring.

17. The connecting device according to claim 16 wherein the body includes a radially inward extending section defining an abutment surface inside the bore, an axial end of the axially compressible spring contacting the abutment surface.

18. A connecting device for connecting a guide tube to a lower nozzle in a nuclear fuel assembly, the connecting device comprising:
    a screw;
    a body having a bore for screwing the screw to a nut through the bore, the screw abutting an abutment surface of the body; and
    a locking device for preventing loosening of the screw, wherein the locking device includes an elastic locking member adapted for retaining the screw into the body after unscrewing the screw, the elastic locking member being adapted to axially push the screw along a screw axis towards the abutment surface,
    wherein the elastic locking member is a radially elastic ring mounted in an annular mounting groove in the body or the screw when the screw is unscrewed, the radially elastic ring being moved into a locking groove upon screwing the screw,
    wherein the locking device comprises the locking groove in the other one of the body and the screw to receive the ring when the screw is tightened to the nut.

19. A nuclear fuel assembly comprising: a bundle of fuel rods; a structure for supporting the fuel rods, the structure comprising an upper nozzle, a lower nozzle and guide tubes extending between the upper nozzle and the lower nozzle; and at least one connecting device according to claim 18, the connecting device connecting a lower end of the guide tubes to the lower nozzle.

20. A nuclear fuel assembly, comprising:
    a bundle of fuel rods;
    a structure for supporting the fuel rods, the structure comprising an upper nozzle, a lower nozzle and guide tubes extending between the upper nozzle and the lower nozzle; and at least one connecting device connecting a lower end of the guide tubes to the lower nozzle, the connecting device comprising:
a screw;
a body having a bore for screwing the screw to a nut through the bore, the screw abutting an abutment surface of the body; and
a locking device for preventing loosening of the screw, wherein the locking device includes an elastic locking member adapted for retaining the screw into the body after unscrewing the screw, the elastic locking member being adapted to axially push the screw along a screw axis towards the abutment surface, the elastic locking member arranged to permanently axially push the screw along the screw axis towards the abutment surface.

* * * * *